United States Patent
Pathak et al.

(10) Patent No.: US 10,140,165 B2
(45) Date of Patent: Nov. 27, 2018

(54) SHELL ACTION BROWSER EXTENSIONS

(71) Applicant: Microsoft Technology Licensing, LLC, Redmond, WA (US)

(72) Inventors: Rajeev Ranjan Pathak, Hyderabad (IN); Bibhu Choudhary, Hyderabad (IN); Akshay Jayant Prabhu, Hyderabad (IN); Irfan Ahmed, Hyderabad (IN); Mandeep Singh, Mohali (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 15/422,808

(22) Filed: Feb. 2, 2017

(65) Prior Publication Data
US 2018/0217880 A1   Aug. 2, 2018

(51) Int. Cl.
*G06F 9/54* (2006.01)
*G06F 9/445* (2018.01)

(52) U.S. Cl.
CPC .............. *G06F 9/542* (2013.01); *G06F 9/445* (2013.01)

(58) Field of Classification Search
None
See application file for complete search history.

(56) References Cited

U.S. PATENT DOCUMENTS

| | | | |
|---|---|---|---|
| 7,712,034 B2 | 5/2010 | Gusmorino et al. | |
| 8,200,962 B1 | 6/2012 | Boodman et al. | |
| 8,739,249 B1 | 5/2014 | Kay et al. | |
| 9,081,589 B2 | 7/2015 | Grossman et al. | |
| 9,274,913 B2 | 3/2016 | Kay et al. | |
| 9,921,860 B1* | 3/2018 | Banga | G06F 9/45533 |
| 2006/0284744 A1* | 12/2006 | Shotland | G06F 17/3089 341/50 |
| 2010/0257255 A1 | 10/2010 | Phillips et al. | |
| 2010/0318832 A1 | 12/2010 | Zeigler et al. | |
| 2014/0047360 A1 | 2/2014 | Kay et al. | |
| 2015/0309851 A9 | 10/2015 | Li et al. | |

(Continued)

FOREIGN PATENT DOCUMENTS

| | | |
|---|---|---|
| CN | 102982169 A | 3/2013 |
| CN | 103078945 B | 11/2015 |

OTHER PUBLICATIONS

Andrew, Ian, "Using push notifications to communicate with your website visitors", http://moveableonline.com/blog/2013/10/11/website-push-notifications/, Published on: Oct. 11, 2013, 3 pages.

(Continued)

*Primary Examiner* — Craig C Dorais

(57) ABSTRACT

Described herein is a shell action browser extension that executes independent of browser when the browser has been terminated. The shell action browser extension includes a communications component that receives notice that the browser is terminating. The shell action browser extension further comprises a transition component that, in response to the received notice, latches onto an operating system as a process independent of the browser. The shell action browser further comprises a content component that receives information from a website/web-service and, in response to receiving the information, based on the received information, provides notification(s) via the operating system.

20 Claims, 7 Drawing Sheets

(56) References Cited

U.S. PATENT DOCUMENTS

2015/0350045 A1 12/2015 Fan et al.
2017/0177671 A1* 6/2017 Allgaier .................... G06F 8/30

OTHER PUBLICATIONS

Gaunt, Matt, "Push Notifications on the Open Web", https://developers.google.com/web/updates/2015/03/push-notifications-on-the-open-web, Published on: Dec. 8, 2016., 32 pages.
Bohn, Dieter, "Your favorite websites can now send notifications to Chrome on Android", http://www.theverge.com/2015/4/20/8454613/push-notifications-android-chrome-42-mobile-web, Published on: Apr. 20, 2015, 12 pages.
Rehman, A., "URL Notification: Send Links to Notification Bar for Easy Access [Android]", http://www.addictivetips.com/mobile/url-notification-send-links-to-notification-bar-for-easy-access-android/, Published on: Feb. 24, 2012, 3 pages.
Betters, Elyse, "Facebook's Notify notification app: What is it and how does it work?", http://www.pocket-lint.com/news/135886-facebook-s-notify-notification-app-what-is-it-and-how-does-it-work, Published on: Nov. 11, 2015, 7 pages.
Sneddon, Joey-Elijah, "Stop Google Chrome from Running in the Background on Windows", http://www.omgchrome.com/stop-chrome-running-in-background-windows/, Published on: Jul. 22, 2014, 9 pages.
"International Search Report & Written Opinion Issued in PCT Application No. PCT/US2018/015629", dated Jun. 22, 2018, 07 Pages.

\* cited by examiner

SHELL ACTION BROWSER EXTENSIONS

BACKGROUND

The use of browsers has become commonplace for computer users around the globe. A browser extension is a computer program that can add and/or modify browser functionality, for example, to improve the user's browsing experience.

SUMMARY

Described herein is a system comprising a computer comprising a processor and a memory. The memory comprises a shell action browser extension comprising a communications component that receives notice that a browser is terminating. The shell action browser extension further comprises a transition component that, in response to the received notice, latches onto an operating system as a process independent of the browser. The shell action browser further comprises a content component that receives information from a website or web-service and, in response to receiving the information, based on the received information, provides notification(s) via the operating system.

Further described herein is a computer storage media storing computer-readable instructions that when executed cause a computing device to maintain a count of each shell action browser extension process which is spawned; in response to receiving notice of termination of a browser, create a dump of shell action browser extension processes before the shell action browser extension processes are terminated; spawn new shell action browser extension processes based on the maintained count; and copy the dump of each of the terminated shell action browser extensions into corresponding new shell action browser extension processes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
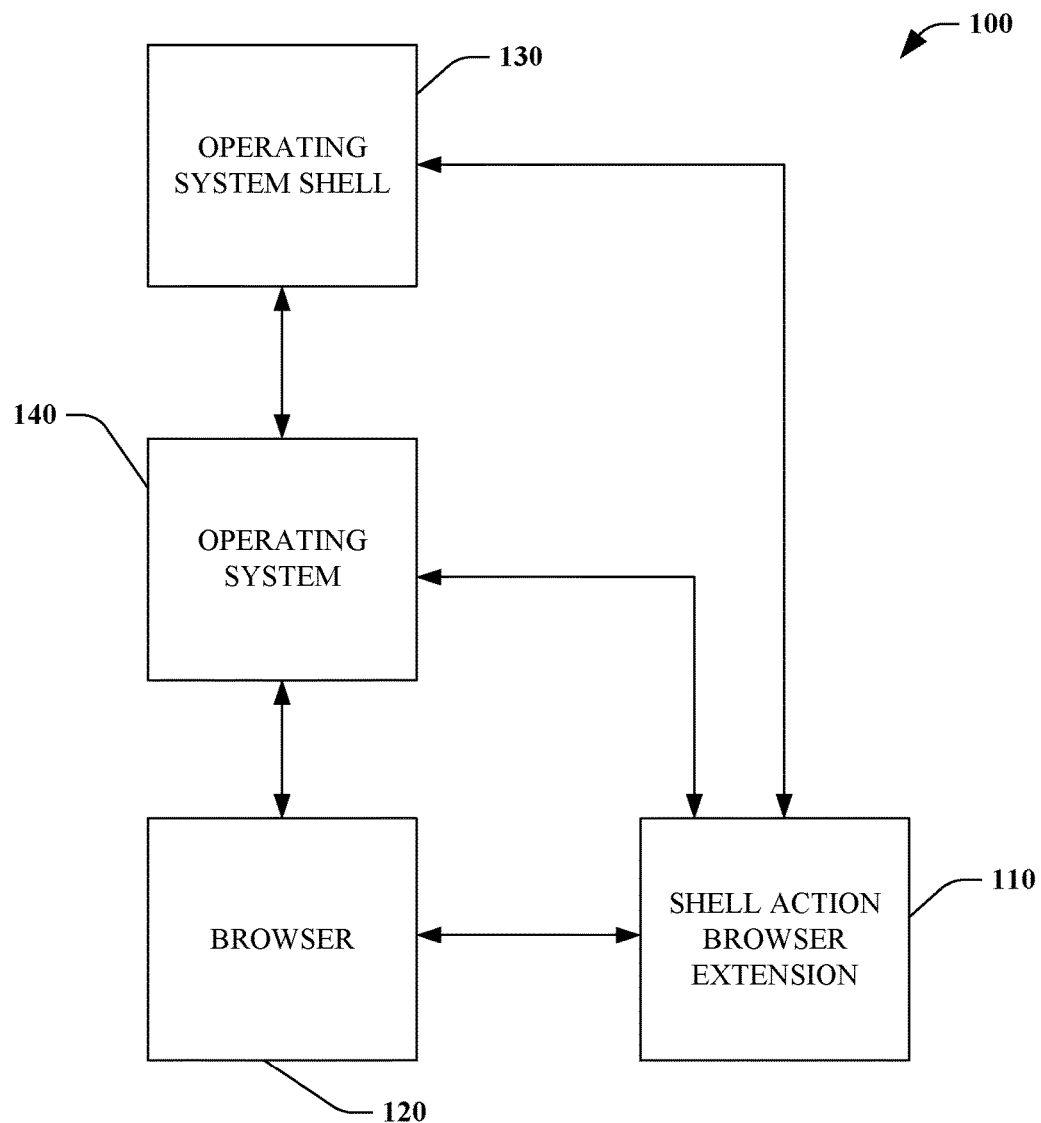
FIG. 1 is a functional block diagram that illustrates a shell action browser system.

Various technologies pertaining to shell action browser extension(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding shell action browser extension(s). What follows are one or more exemplary systems and methods.

Aspects of the subject disclosure pertain to the technical problem of allowing a browser extension to continue executing when a browser has been terminated. The technical features associated with addressing this problem involve allowing a shell action browser extension to execute independent of the browser when the browser has been terminated. Accordingly, aspects of these technical features exhibit technical effects of facilitating notification(s), for example, via an operating system shell, by a shell action browser extension when the browser has been terminated.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

As discussed previously, a browser extension is a computer program that can add and/or modify browser functionality, for example, to improve the user's browsing experience. For example, a browser extension can engulf functionalities to support opening certain file type(s) (e.g., .jpeg, ePUB, .pdf, etc.). Conventionally, browser extensions can be classified into two broad categories depending on how the browser extension augments and/or modifies browser functionality.

First, "browser action" extension(s) refer to extensions that work on web page(s) opened in the browser generally without regard to which website is operational. Examples of browser action extensions include virtual private network extension(s) and/or web content clipper tool extension(s).

A second category is "page action" extension(s) which refers to extensions that generally act on a specific set of web page(s) depending on whether the pages match criteria for the extension. An example of a page action extension includes a translator extension that works on web page(s) which are in a different language when compared to a default system language associated with the browser.

Conventionally, extensions are dependent on a state of a browser in order to execute. A browser content process responsible for execution of an extension (e.g., background script) is dependent on the execution of the browser. That is, the extension is a child process of the browser. Accordingly, once the browser is closed (e.g., terminated), extension(s) generally are not able to execute.

Referring to FIG. 1, a shell action browser system 100 is illustrated. The system 100 facilitates a shell action browser extension 110 to execute independent of a browser 120 when the browser 120 has been terminated.

In one embodiment, a process of the browser 120 (e.g., parent process) can maintain a count for each shell action browser extension 110 child process which is spawned. For example, a shell action browser extension 110 can be identified by "shell action" specified in a manifest file. In the event of termination of the parent browser 120 process either through user action and/or due to automated scripts or crashes, a dump of shell action browser extension 110 process(es) can be created before terminating the parent browser 120 process. For example, the dump can comprise state variable(s), environment variable(s) and/or local variable(s) of each shell action browser extension 110 process along with other data about the shell action browser extension 110 process. The operating system shell 130 can spawn a count of new shell action browser extension 110 processes equivalent to the count of shell action browser extension(s) 110 maintained in the browser 120 process. Post-spawning of new shell action browser extension 110 process(es), the dump of each of the terminated shell action browser extension(s) 110 can get copied to the corresponding new shell action browser extension 110 process(es). This ensures that the shell action browser extension 110 process(es) (e.g., originally spawned as child process(es) of the browser 120) are spawned as new independent processes.

In one embodiment, the shell action browser extension 110 communicates with the operating system shell 130 in order to become a process independent of the browser 120. The operating system shell 130 is an application that implements a user interface that is tightly integrated with an operating system 140. In one embodiment, the operating system shell 130 has access to kernel mode application programming interface(s) (APIs) of the operating system which are not generally accessible to user application(s). In one embodiment, the shell action browser extension 110 communicates directly with the operating system 140 in order to become a process independent of the browser 120.

Frequently, extensions and/or websites desire to consistently communicate with users in the form of notifications. For example, communication needs can arise to achieve communicating security concerns, promotion (e.g., of offers and/or discounts), pushing of content (e.g., information) and/or building engagement (e.g., usage). Websites and/or extensions being dependent on browser, cannot achieve these objectives as there are no services in the background running to ensure that the background script for the extensions is running. Thus, an inability to continue to provide information to a user once the browser has terminated is a shortcoming of existing browser extensions.

In one embodiment, the shell action browser extension 110 (e.g., background script) can execute independent of the browser 120 by leveraging the operating system shell 130 (e.g., running as a service). In one embodiment, when executing independently of the browser 120, the shell action browser extension 110 can surface notification(s) (e.g., to a user) from website(s).

The shell action browser extension 110 can receive notice of the browser 120 being selected and/or identified for termination (e.g., by a user). In one embodiment, the notice is based on an explicit user action, for example, the user closing the browser 120. In one embodiment, the notice is based on an implicit determination that the browser will be terminated, for example, since the browser 120 has been unresponsive for a predetermined period of time.

The notice can be received, for example, from the browser 120, from the operating system shell 130 and/or the operating system 140. In response to the notice, the shell action browser extension 110 can latch onto the operating system 140 and/or the operating system shell 130 and execute as a process independent from the browser 120. In this manner, the shell action browser extension 110 changes from a child process of the browser 120 to an independent process. By executing as an independent process (e.g., without keeping the browser 120 process active or portion thereof active), system resources (e.g., computing power and/or memory) can be conserved.

Once the browser 120 has terminated, the shell action browser extension 110 can continue to surface notification(s) (e.g., provide information to a user) via the operating system shell 130. For example, through the shell action browser extension 110, a website or web-service can provide information regarding a number of unread emails, news updates and/or shopping suggestions. In one embodiment, notification(s) can be provided to a user by one or more notification systems of the operating system 140 and/or the operating system shell 130. In one embodiment, the notification(s) are provided through the Windows® action center and/or start tiles. For example, upon a user action (e.g., clicking on action center action center notification and/or start tile), the browser 120 can be launched with suitable target webpage(s).

In one embodiment, a user can opt-in to allow shell action browser extension(s) 110 to execute independent of the browser 120 when the browser 120 has been terminated. In one embodiment, a user can selectively enable one or more shell action browser extensions 110 to execute as a process independent of the browser 120 when the browser 120 has been terminated. In one embodiment, a user can selectively disable one or more shell action browser extensions 110 from executing as a process independent of the browser 120 when the browser 120 has been terminated.

In one embodiment, in response to terminating the browser 120, a notification can be provided to a user identifying one or more shell action browser extensions 110 that will execute as a process independent of the browser 120 when the browser 120 has been terminated. In one embodiment, the user can enable and/or disable one or more shell action browser extensions 110 to execute independent of the browser 120 in response to the provided notification.

When the browser 120 is reopened, another instance of the shell action browser extension 110 can be created by the reopened browser 120. In one embodiment, in order to prevent duplicate instances of the same shell action browser extension 110, the first instance of the shell action browser extension 110 is terminated in response to notice of instantiation of a duplicate shell action browser extension 110. In one embodiment, in order to prevent duplicate instances of the same shell action browser extension 110, the second instance of the shell action browser extension 110 is terminated in response to notice of instantiation of a duplicate shell action browser extension 110.

In one embodiment, the shell action browser extension 110 communicates with the operating system shell 130 via application programming interfaces exposed by the operating system shell 130. The shell action browser extension 110, the browser 120, the operating system shell 130 and/or the operating system 140 can be components, as set forth above.

Figure 2:
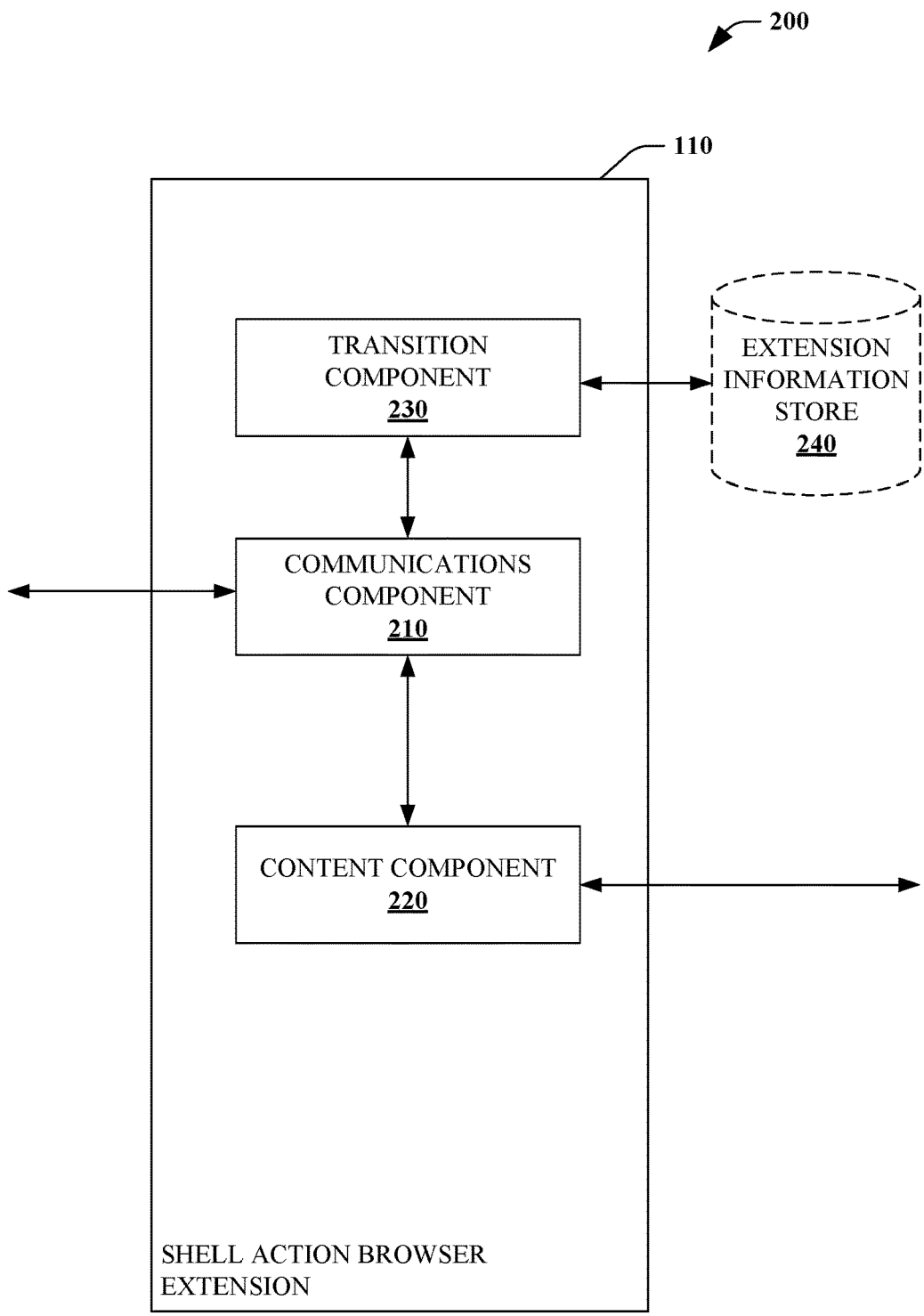
FIG. 2 is a functional block diagram that illustrates a system including a shell action browser extension.

Turning to FIG. 2, a system 200 including the shell action browser extension 110 which can include a communications component 210, a content component 220 and/or a transition component 230. The communications component 210 can receive notice from the browser 120, the operating system shell 130 and/or the operating system 140 that the browser 120 has been selected and/or identified for termination.

In response to this notice, the communication component 210 can notify the transition component 230 which can initiate transition of the shell action browser extension 110 from a child process of the browser 120 to an independent process. In one embodiment, the transition component 230 can communicate with the operating system shell 130 (e.g., using APIs of the operating system shell 130) to latch the shell action browser extension 110 onto the operating system shell 130 and execute as a process independent from the browser 120.

Once the shell action browser extension 110 has transitioned to an independent process, the shell action browser extension 110 can surface notification(s) via the operating system shell 130 and/or the operating system 140. The notification(s) can be based on information received from website(s) and/or web-service(s) by the content component 220.

In the event that the browser 120 is reopened (e.g., another browsing session enabled), the transition component 230 can receive notice via the communications component 210. In one embodiment, in response to the notice, in order to prevent duplicate instances of the same shell action browser extension 110, the transition component 230 of a first instance of the shell action browser extension 110 can initiate termination of the first instance of the shell action browser extension 110. In one embodiment, in response to the notice, in order to prevent duplicate instances of the same shell action browser extension 110, the transition component 230 of a first instance of the shell action browser extension 110 can initiate termination of a second instance of the shell action browser extension 110.

In one embodiment, the shell action browser extension 110 can store state information in an extension information store 240. In this manner, a first instance of the shell action browser extension 110 can communicate information (e.g., user information, user selection(s), user setting(s), etc.) to a second instance of the shell action browser extension 110, before the first instance of the shell action browser extension 110 is terminated.

In one embodiment, shell action browser extensions 110 are terminated when the operating system shell 130 process terminates (shut down). In one embodiment, the browser 120 is invoked at least once to ensure that the shell action browser extension 110 process(es) are re-spawned. However, in one embodiment, one or more certain shell action browser extension(s) 110 can be selectively enabled to run at startup without the browser 120 being invoked through user permission. This allows shell action extensions 110 to spawn without the parent browser 110 process. In the event of the browser 110 process being spawned, termination of shell action browser extension 110 process(es) can be performed as set forth above.

FIGS. 3-6 illustrate exemplary methodologies relating to shell action browser extensions. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 3:
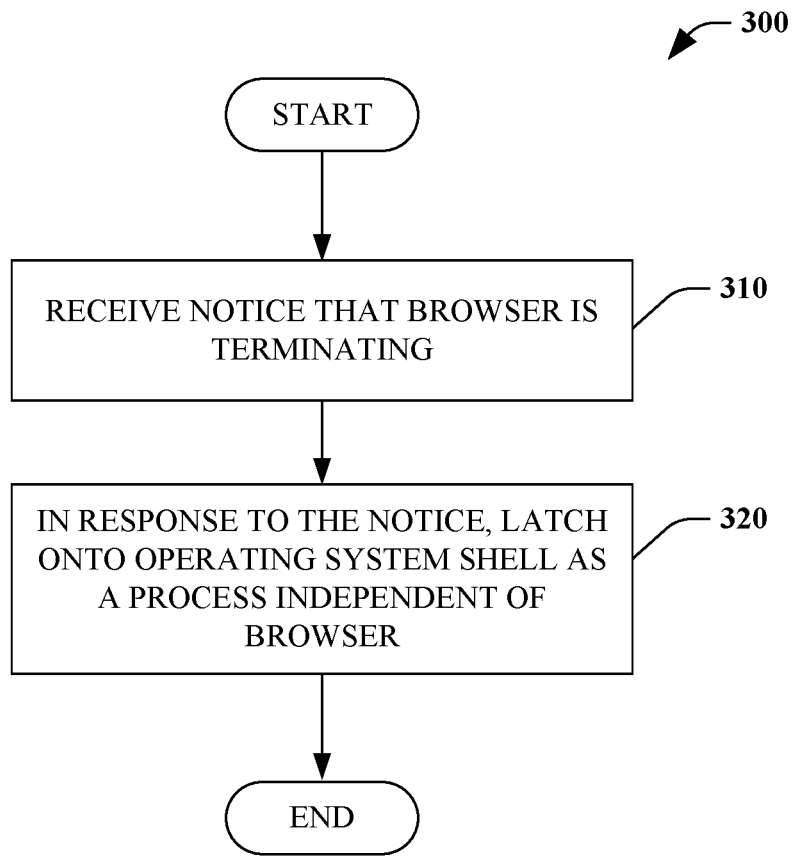
FIG. 3 illustrates an exemplary methodology of a method of providing browser extension functionality.

Referring to FIG. 3, a method of providing browser extension functionality 300 is illustrated. At 310, a notice that a browser associated with a shell action browser extension is terminating is received, for example, by the shell action browser extension. At 320, in response to the notice, the shell action browser extension latches onto the operating system shell as a process independent of the browser. Accordingly, once the browser has been terminated, the shell action browser extension can continue to provide notification(s) (e.g., to a user) via the operating system shell.

Figure 4:
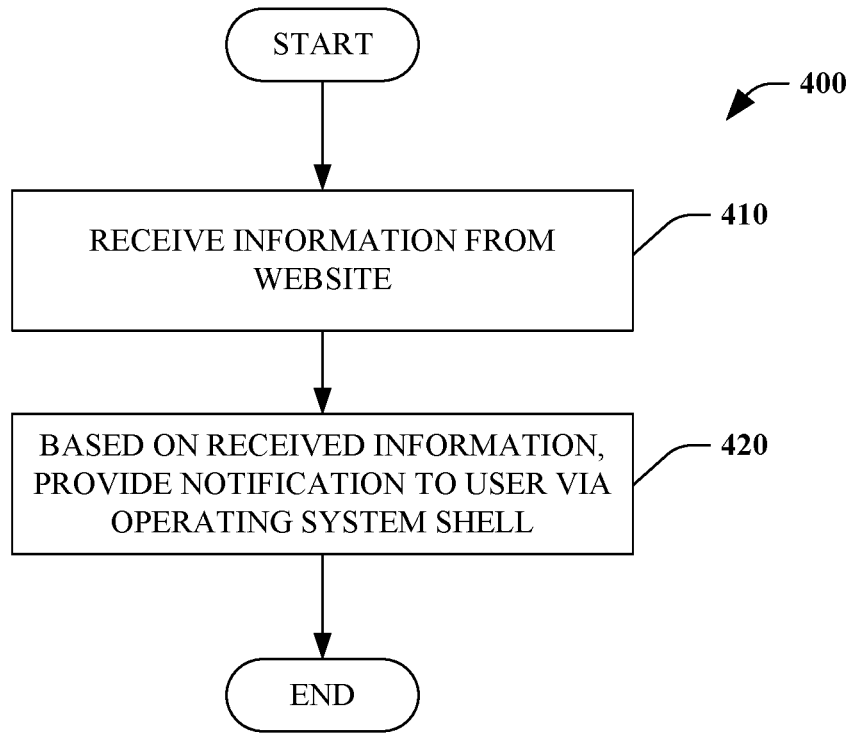
FIG. 4 illustrates an exemplary methodology of a method of providing browser extension functionality.

Turning to FIG. 4, a method of providing browser extension functionality 400 is illustrated. In one embodiment, the method 400 is be performed by a shell action browser extension after a browser has been terminated. At 410, information is received from a website/web-service, for example, associated with the shell action browser extension. At 420, based on the received information, notification is provided (e.g., to a user) via the operating system shell.

Figure 5:
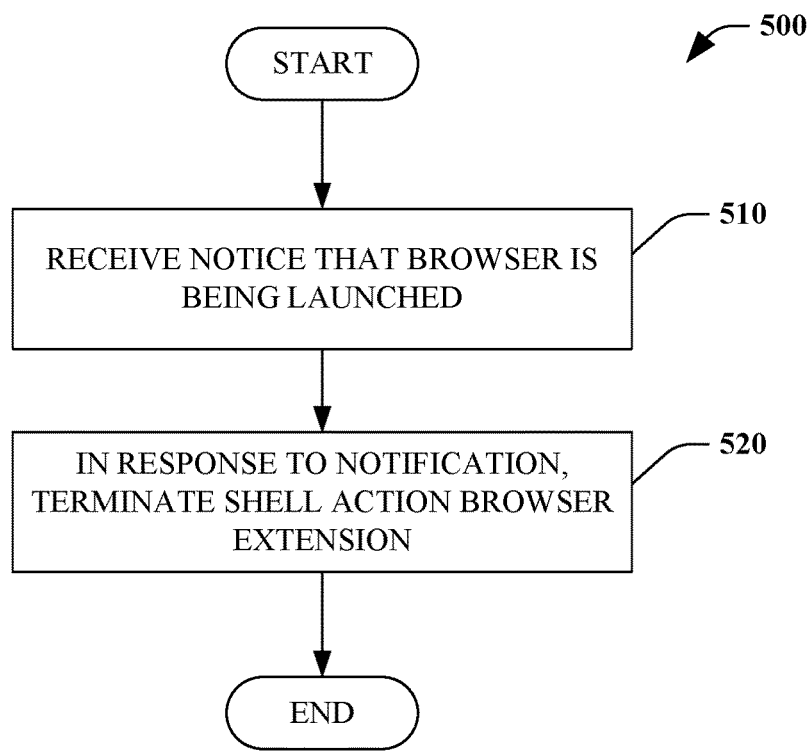
FIG. 5 illustrates an exemplary methodology of a method of terminating a shell action browser extension.

Next, referring to FIG. 5, a method of terminating a shell action browser extension 500 is illustrated. At 510, a notice that a browser is being launched is received by the shell action browser extension. At 520, in response to the notice, the shell action browser extension is terminated.

Figure 6:
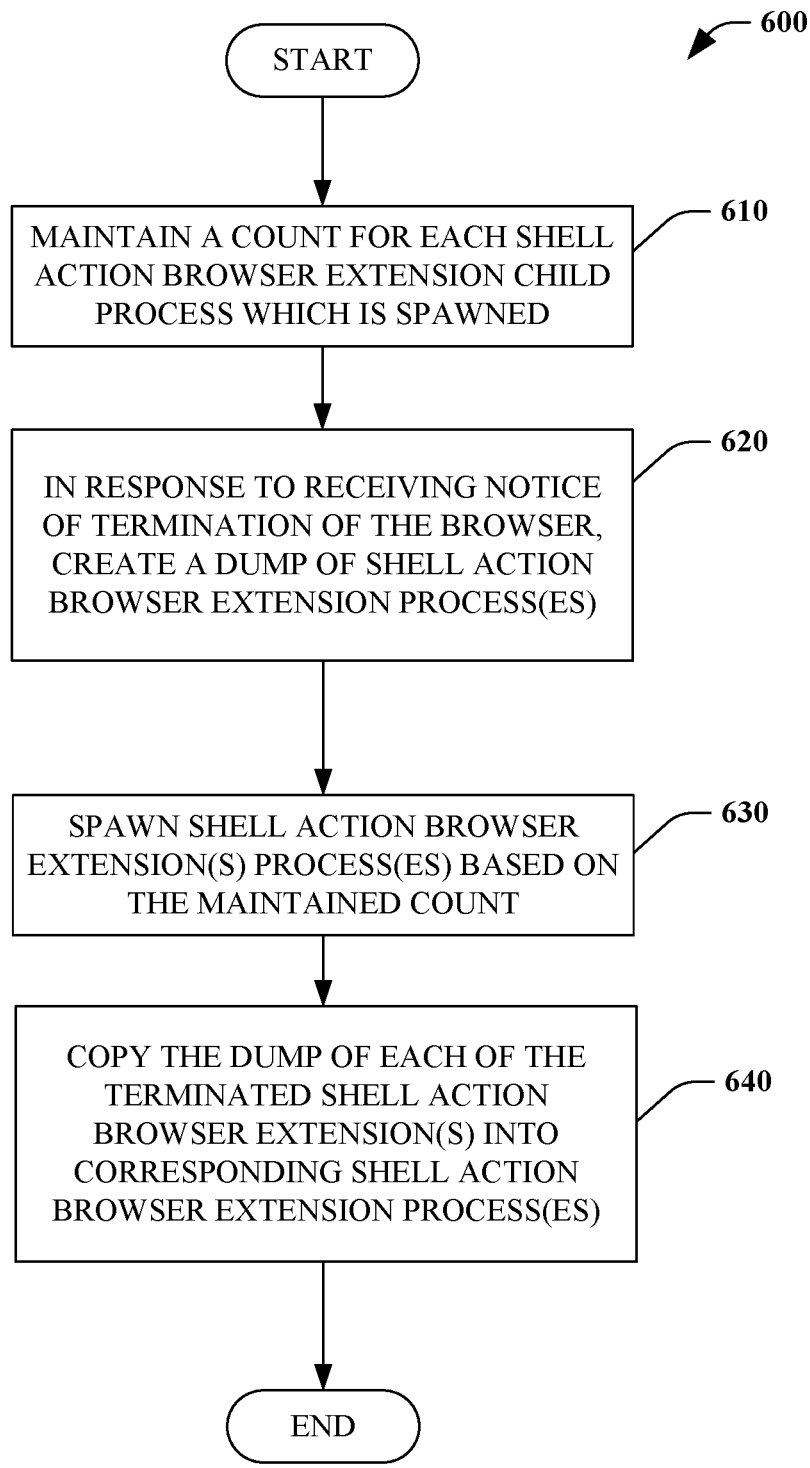
FIG. 6 illustrates an exemplary methodology of a method of facilitating shell action browser extension(s).

Turning to FIG. 6, a method of facilitating shell action browser extension(s) 600 is illustrated. At 610, a count for each shell action browser extension child process which is spawned can be maintained, for example, by a parent browser process of the browser.

At 620, in response to receiving notice of termination of the browser, a dump of shell action browser extension process(es) can be created before terminating the parent browser process. For example, the dump can comprise state variable(s), environment variable(s) and/or local variable(s) of each the shell action browser extension process along with other data about the shell action browser extension process.

At 630, a count of new shell action browser extension processes equivalent to the count of shell action browser extension(s) maintained in the browser process can be spawned, for example, by the operating system shell. For example, the new shell action browser extension process(es) can be process(es) independent of the browser process.

At 640, the dump of each of the terminated shell action browser extension(s) 110 can get copied to the new corresponding shell action browser extension process(es). This ensures that the shell action browser extension process(es) (e.g., which were originally spawned as child process(es) of the browser) are spawned as new independent processes.

Described herein is a system comprising a computer comprising a processor and a memory. The memory can comprise a shell action browser extension comprising a communications component that receives notice that a browser is terminating; a transition component that, in response to the received notice, latches onto an operating system as a process independent of the browser; and, a content component that receives information from a website and, in response to receiving the information, based on the received information, provides a notification via the operating system.

The system can include wherein the notice that the browser is terminating is based on a user action. The system can include wherein the notice that the browser is terminating is based on an implicit determination that the browser will be terminated has been unresponsive for a predetermined period of time. The system can include wherein the transition component, in response to receiving notice that another instance of the browser is loading, terminates the shell action browser extension.

The system can include wherein the transition component, in response to receiving notice that another instance of the browser is loading, terminates a second instance of the shell action browser extension. The system can include wherein the user can opt-in to allow the shell action browser extension to execute as a process independent of the browser when the browser has been terminated. The system can include wherein a user can selectively enable the shell action browser extension to execute as a process independent of the browser when the browser has been terminated.

The system can include wherein a user can selectively disable the shell action browser extension from executing as a process independent of the browser when the browser has been terminated. The system can include another notification is provided to a user identifying the shell action browser extension will execute as a process independent of the browser.

Described herein is a method, comprising, by a shell action browser extension, receiving notice that a browser associated with the shell action browser extension is being terminated; and in response to the notice, by the shell action browser extension, latching onto an operating system shell as a process independent of the browser.

The method can include in response to receiving notice that another instance of the browser is loading, terminating the shell action browser extension. The method can include in response to receiving notice that another instance of the browser is loading, terminating a second instance of the shell action browser extension. The method can include wherein a user can selectively enable the shell action browser extension to execute as a process independent of the browser when the browser has been terminated.

The method can include wherein a user can selectively disable the shell action browser extension from executing as a process independent of the browser when the browser has been terminated. The method can include receiving information from a website and, in response to receiving the information, based on the received information, providing a notification to a user via the operating system shell.

Described herein is a computer storage media storing computer-readable instructions that when executed cause a computing device to maintain a count of each shell action browser extension process which is spawned; in response to receiving notice of termination of a browser, create a dump of shell action browser extension processes before the shell action browser extension processes are terminated; spawn new shell action browser extension processes based on the maintained count; and copy the dump of each of the terminated shell action browser extensions into corresponding new shell action browser extension processes.

The computer storage media can include wherein the dump comprises a state variable associated with a particular shell action browser extension process. The computer storage media can include wherein the dump comprises an environment variable associated with a particular shell action browser extension process. The computer storage media can include wherein the dump comprises a local variable associated with a particular shell action browser extension process. The computer storage media can include wherein the new shell action browser extension processes are spawned independent of the browser.

Figure 7:
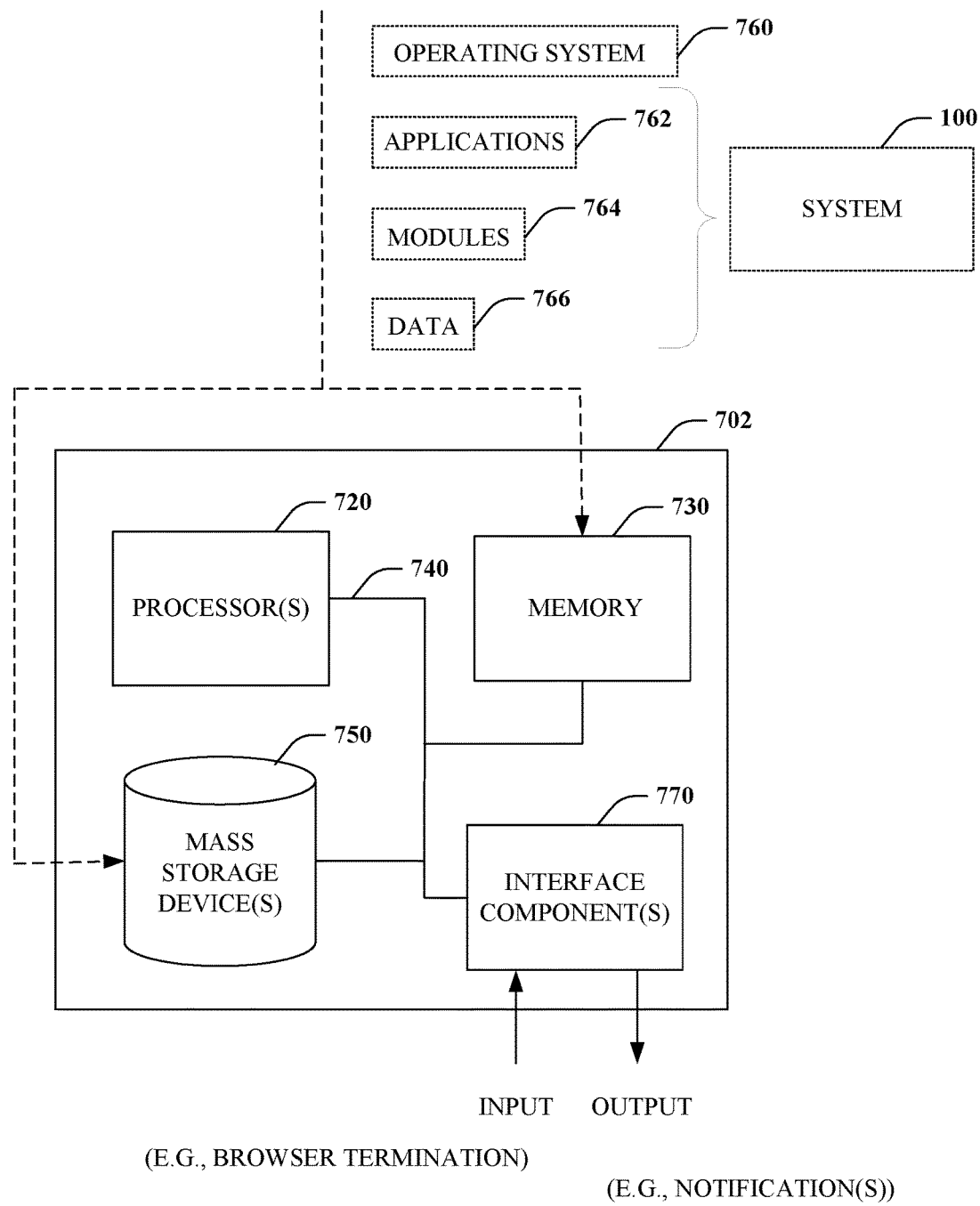
FIG. 7 is a functional block diagram that illustrates an exemplary computing system.

With reference to FIG. 7, illustrated is an example general-purpose computer or computing device 702 (e.g., mobile phone, desktop, laptop, tablet, watch, server, handheld, programmable consumer or industrial electronics, set-top box, game system, compute node, etc.). For instance, the computing device 702 may be used in a system 200 including the shell action browser extension 110.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100, the shell action browser extension 110 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
    a computer comprising a processor and a memory, the memory comprising:
        a shell action browser extension comprising:
            a communications component that receives notice that a browser is terminating;
            a transition component that, in response to the received notice, latches onto an operating system by transitioning the shell action browser extension to a process independent of the browser that continues to execute after termination of the browser; and,
            a content component that receives information from a website and, in response to receiving the information, based on the received information, provides a notification via the operating system.

2. The system of claim 1, wherein the notice that the browser is terminating is based on a user action.

3. The system of claim 1, wherein the notice that the browser is terminating is based on an implicit determination that the browser will be terminated has been unresponsive for a predetermined period of time.

4. The system of claim 1, wherein the transition component, in response to receiving notice that another instance of the browser is loading, terminates the shell action browser extension.

5. The system of claim 1, wherein the transition component, in response to receiving notice that another instance of the browser is loading, terminates a second instance of the shell action browser extension.

6. The system of claim 1, wherein the user can opt-in to allow the shell action browser extension to execute as a process independent of the browser when the browser has been terminated.

7. The system of claim 1, wherein a user can selectively enable the shell action browser extension to execute as a process independent of the browser when the browser has been terminated.

8. The system of claim 1, wherein a user can selectively disable the shell action browser extension from executing as a process independent of the browser when the browser has been terminated.

9. The system of claim 1, another notification is provided to a user identifying the shell action browser extension will execute as a process independent of the browser.

10. A method, comprising:
by a shell action browser extension, receiving notice that a browser associated with the shell action browser extension is being terminated; and
in response to the notice, by the shell action browser extension, latching onto an operating system shell by transitioning the shell action browser extension to a process independent of the browser that continues to execute after termination of the browser.

11. The method of claim 10, further comprising:
in response to receiving notice that another instance of the browser is loading, terminating the shell action browser extension.

12. The method of claim 10, further comprising:
in response to receiving notice that another instance of the browser is loading, terminating a second instance of the shell action browser extension.

13. The method of claim 10, wherein a user can selectively enable the shell action browser extension to execute as a process independent of the browser when the browser has been terminated.

14. The method of claim 10, wherein a user can selectively disable the shell action browser extension from executing as a process independent of the browser when the browser has been terminated.

15. The method of claim 10, further comprising:
receiving information from a website and, in response to receiving the information, based on the received information, providing a notification to a user via the operating system shell.

16. A computer storage media storing computer-readable instructions that when executed cause a computing device to:
maintain a count of each shell action browser extension process which is spawned;
in response to receiving notice of termination of a browser, create a dump of shell action browser extension processes before the shell action browser extension processes are terminated;
spawn new shell action browser extension processes based on the maintained count; and
copy the dump of each of the terminated shell action browser extensions into corresponding new shell action browser extension processes which continue to execute after termination of the browser.

17. The computer storage media of claim 16, wherein the dump comprises a state variable associated with a particular shell action browser extension process.

18. The computer storage media of claim 16, wherein the dump comprises an environment variable associated with a particular shell action browser extension process.

19. The computer storage media of claim 16, wherein the dump comprises a local variable associated with a particular shell action browser extension process.

20. The computer storage media of claim 16, wherein the new shell action browser extension processes are spawned independent of the browser.

* * * * *